United States Patent Office 3,478,239
Patented Nov. 11, 1969

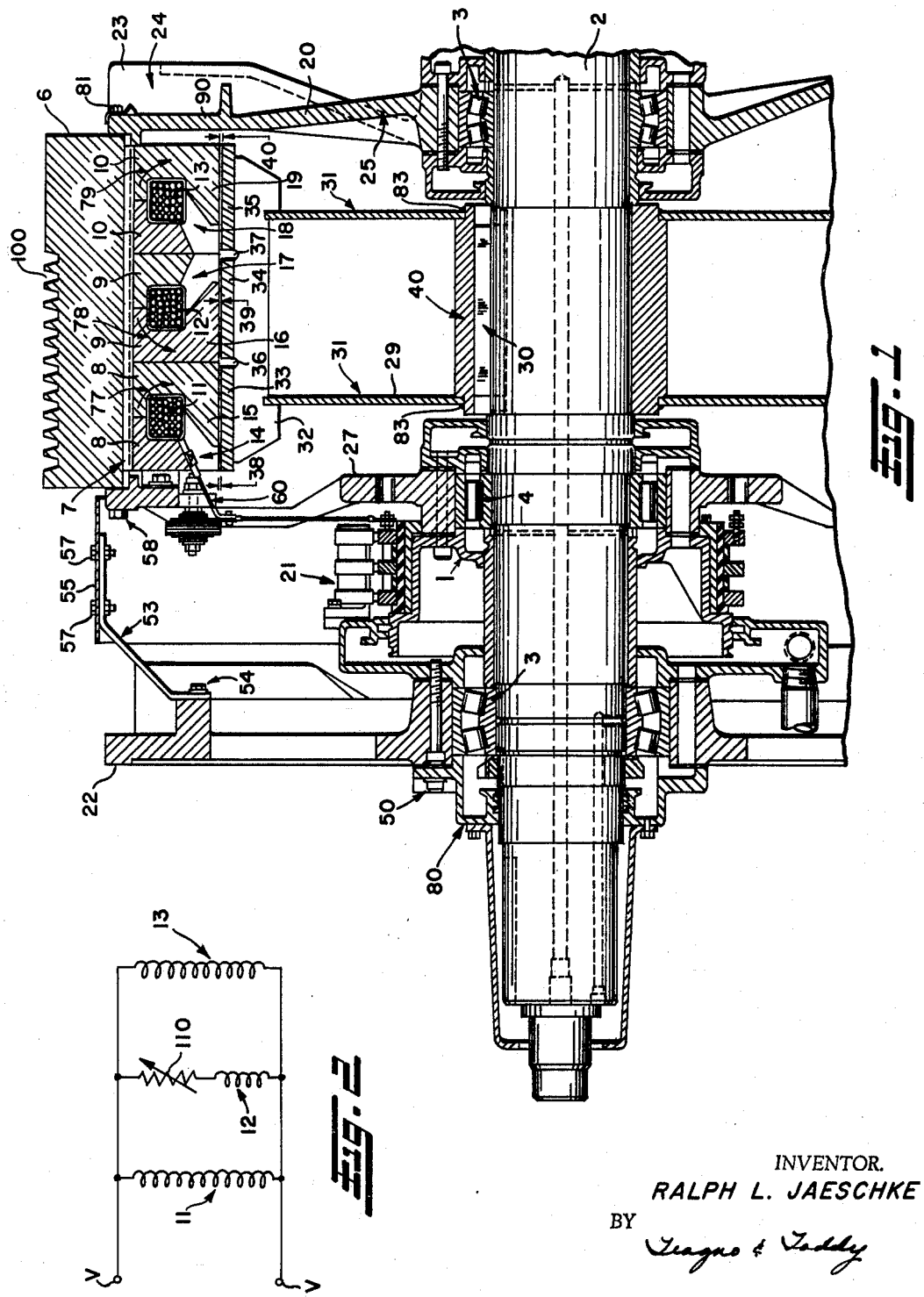

3,478,239
EDDY-CURRENT COUPLING
Ralph L. Jaeschke, Kenosha, Wis., assignor to Eaton, Yale & Towne Inc., Cleveland, Ohio, a corporation of Ohio
Filed Sept. 26, 1967, Ser. No. 670,554
Int. Cl. H02k 49/02
U.S. Cl. 310—105                              10 Claims

ABSTRACT OF THE DISCLOSURE

The apparatus disclosed is an eddy-current electromagnetic coupling which may be used for power transmission purposes. A prime mover operates to drive the input member of the coupling at a substantially uniform speed. The output or driven member of the coupling, which is separated from the input member by an air gap, rotates at a speed which is less than that of the input or driving member. The difference in speed between the input and output members of the coupling is converted into thermal energy, i.e. heat. In the apparatus disclosed the temperature difference between the input and output members is maintained substantially uniform throughout the axial length of the air gap of the coupling. As a result, the heat dissipation capability of the coupling is improved resulting in an increase horsepower rating and thermal efficiency of the coupling.

BACKGROUND OF THE INVENTION

This invention relates to an eddy-current coupling which is a slip speed power transmitting device. Since the output or driven member of an eddy-current coupling rotates at a speed which is less than that of the input or driving member, the difference in such speeds is converted into thermal energy, which is heat. Thus, the horsepower rating and thermal efficiency of the coupling is proportional to the coupling's ability to dissipate this heat which is generated. Previous couplings have dissipated this heat by providing effective cooling methods such as fan means disposed at critical portions of the coupling for effectively moving air across cooling fins disposed about the coupling. Such movement of air operates to adsorb the heat which is generated during the operation of the coupling. However, in eddy-current couplings the temperature of the heat generated is not uniform throughout the entire axial length of the coupling.

This disparity in temperature reduces the effectiveness of the cooling methods. Thus, by maintaining the temperature across the coupling substantially uniform, additional quantities of heat can be dissipated resulting in an improved eddy-current coupling.

SUMMARY OF THE INVENTION

Among the several objects of the invention is the provision of an eddy-current coupling in which the cooling efficiency is substantially increased; the provision of an eddy-current coupling in which the thermal balance of the coupling is improved; the provision of an eddy-current coupling in which the temperature of the heat generated in the coupling is maintained substantially uniform throughout the axial length of the magnetic air gap which exists between the relatively rotatable members of the coupling, thus providing for a more efficient coupling. Other objects and features will be in part apparent and part pointed out hereinafter.

The term "coupling" as used herein includes apparatus wherein torque is transmitted between a pair of relatively rotatable members, whether it is either or both of the members which rotate. Examples of such apparatus are clutches, brakes and dynamometers.

Briefly, an eddy-current coupling according to the present invention includes an input or driving member having one or more field coils and an output or driven member. The driving and driven members are radially separated from each other by an air gap.

By properly energizing the field coil or coils of the driving member, the output member is caused to rotate at a speed which is less than that of the input or driving member. The difference in speeds is converted into heat which must be effectively dissipated. A coupling constructed according to this invention will have a substantially uniform temperature across the axial length thereof particularly in the area of the air gap separating the driving and driven members. As a result, the ability of the coupling to dissipate the heat generated is increased resulting in a more efficient coupling.

BRIEF DESCRIPTION OF THE DRAWINGS

FIGURE 1 shows a partial axial section of an eddy-current coupling illustrating the invention.

FIGURE 2 shows a circuit diagram illustrating another form of the invention.

DESCRIPTION OF THE PREFERRED EMBODIMENT

An eddy-current slip coupling is shown in FIGURE 1 comprising two relatively rotatable members. Such an eddy-current coupling may be used for power transmission purposes, for example, in the area of press drive systems where the coupling is used for transmitting power from a prime mover, such as a constant speed A.C. induction motor, to the press. Other areas of application in the field of power transmission for eddy-current couplings constituting this invention are also readily available. As indicated above, it will also be understood that the eddy-current coupling shown in FIGURE 1 may be used as a dynamometer for testing purposes or as a brake. Such use may be accomplished by maintaining stationary either the rotor member or field member of the coupling.

As disclosed in FIGURE 1, a driven or output shaft 2 is disposed inside a quill or input shaft member 1. The drive quill 1 rotates relative with respect to driven shaft 2 by means of spherical roller bearings 3 disposed at the right axial end of the coupling and roller bearings 4 located approximately midway along the axial length of the shaft arrangement. It will be readily understood that various types of bearings can be used and the roller bearings as shown in the drawings are merely for exemplary purposes. Furthermore, it is also possible to employ two co-axial shafts, one a drive shaft and the second a driven or output shaft, in place of the quill arrangement shown in the drawing.

A pedestal or annular support member 22 circumferentially surrounds and supports the left end of the quill shaft arrangement. Fastened to the pedestal 22 by bolt means 50 is a bearing cap means 80. Although not shown in the drawing, it will be understood that a plurality of bolts 50 are annularly disposed about the bearing cap in order to properly fasten the bearing cap assembly to the pedestal member 22. Thus, the shaft arrangement including quill member 1 and shaft 2 is supported by and caused to rotate with respect to the stationary pedestal member 22 due to a bearing means such as a second spherical anti-friction roller bearing means 3.

An annular guard means 55 for preventing dirt and other contaminates from entering the coupling and interfering with its operation is circumferentially disposed about the shaft arrangement and supported by metal support arm means 53 which are bolted to the guard 55 by a plurality of bolt means 57. Support means 53 is fastened to the pedestal 22 by bolts 54 which are annularly disposed about the right axial side of the pedestal.

A field support means 27 radially extends from the drive quill 1 terminating at a distance short of the metal guard 55 thus leaving a small space between the guard 55 and the end of field support means 27. Such space is large enough for support means 27 to rotate freely with respect to said guard 55 while at the same time effectively preventing any contaminates from entering the coupling. Field support means 27 is affixed to the left axial side of an eddy-current field member 6 by means of a plurality of fasteners, such as bolts 58 which are annularly disposed about the radial extremity of the support means 27.

A second field support means 20 is annularly disposed about quill member 1 on the right axial side of the field member 6. Support means 20 includes fan 23 which consists of fins 24 and spider means 25. The rim of the spider is outwardly offset as shown at 90 to provide a large peripheral space occupied by radially disposed fan blades 23. Support means 20 is fastened to the clutch field assembly 6 at its radial extremity by a plurality of fasteners such as bolts 81 which are annularly disposed about the support means 20.

The clutch field assembly 6 includes a flywheel having a plurality of V-grooves 100 for receiving a plurality of power transmitting V-belts (not shown) which couple the field assembly of the eddy-current coupling to a prime mover, such as a constant speed A.C. induction motor. The V-belts thus operate to cause the clutch field assembly 6 to rotate at a speed which is proportional to that of the prime mover. It will be understood that V-belts are merely one means of accomplishing the driving function necessary to rotate the field assembly. For example, the clutch field assembly 6 could be directly connected to the output of a prime mover by connecting the input or drive shaft of the coupling to the output shaft of the prime mover.

Clutch field assembly 6 includes an annular steel drum member 7 which supports three pairs of pole rings 8, 9 and 10. The pole rings are made of a magnetizable material, such as ferromagnetic material. Annular field coils 11, 12 and 13 are flanked by and associated with the pole rings of the respective pairs 8, 9 and 10. In other words, annular field coils 11, 12 and 13 are associated with and surrounded by the pole ring pairs 8, 9 and 10 respectively. Emanating from the pole rings are a plurality of oppositely extending interdigitated magnetizable pole teeth 14, 15, 16, 17, 18 and 19 which correspond respectively to the pole ring pairs 8, 9 and 10. For example, extending from the pole ring pair 8 are a series of a plurality of oppositely extending interdigitated pole teeth 14 and 15; extending from pole ring pair 9 are a series of a plurality of oppositely extending interdigitated pole teeth 16 and 17; and extending from pole ring pair 10 are a series of a plurality of oppositely extending interdigitated pole teeth 18 and 19.

The annular field coils 11, 12 and 13 are energized through lead 60 which is connected to a brush and slip ring assembly 21 attached to pedestal 22 and clutch field support means 27. The brush and slip ring assembly 21 is connected to a D.C. power supply for appropriately energizing the annular field coils. Details of the D.C. power supply are not shown in the drawing but is of the type which is capable of supplying the proper D.C. voltage and current necessary for energizing the winding. Such power supplies are commonly known and readily available from several sources.

Clutch rotor assembly 29 includes an annular hub member 40 which circumferentially surrounds and is in contact with the driven shaft 2. A key member 30 joins the rotor shaft assembly 29 to the shaft 2 at the hub member 40. Protruding radially from the hub member 40 are a pair of axially spaced disc members 31. Disc members 31 which are adhered to the hub member 40 by means of welds 83 support at their outer radial end, a plurality of circumferentially disposed fin members 32. Fin members 32 in turn support a plurality of circumferentially disposed magnetizable inductor drum segments 33, 34 and 35. It will be readily understood that individual inductor segments 33, 34 and 35 in each series are also separated by axially directed slots at various points around the circumference of such segments which are not shown in the drawings. The magnetizable inductor drum segments 33 and 34 are axially separated from each other by spaces 36. In a like fashion, spaces 37 axially separate inductor segments 34 and 35 from each other.

Fins 32 and fan members 20 operate to effectively cool the eddy-current coupling by circulating air which dissipates the heat generated during the couplings' operation in a manner which will be explained more fully hereinafter.

Magnetic air gaps 38, 39 and 40 are located between the outer faces of the magnetizable interdigitating pole teeth 14, 15, 16, 17, 18 and 19 and inductor segments 33, 34 and 35. In other words, an air gap 38 having a substantially uniform width axially extends between the pole teeth 14, 15 associated with ring member 8 and inductor segment 33. A similar air gap 39 also having a substantially uniform width axially extends between pole teeth 16, 17 of ring 9 and inductor segment 34. Likewise, air gap 40 having a substantially uniform width extends between pole teeth 18, 19 associated with ring member 10 and inductor segment 35.

The term "width" as used herein in connection with air gap refers to the dimension separating the outer faces of the interdigitating pole teeth and the inductor segments.

The operation of the invention shown in FIGURE 1 will now be described.

The clutch field and flywheel assembly 6 and quill member 1 are rotated at a constant speed by a suitable prime mover by means of V-belts which are disposed in the grooves 100 of the flywheel. The coils 11, 12 and 13 are connected at a polarity so as to establish a toroidal magnetic field resulting in a flux flow pattern about each coil in a direction which is shown in the drawings by arrows 77, 78 and 79 about coils 11, 12 and 13 respectively. The magnetic flux generated and represented by numerals 77, 78 and 79 respectively interlinks the interdigitating pole teeth 14 and 15 of ring 8, pole teeth 16 and 17 of ring 9, and pole teeth 18 and 19 of ring 10 with their respective inductor drum segments 33, 34 and 35. In other words, the magnetic flux 77 generated by energizing coil 11 interlinks the magnetic interdigitating pole teeth members 14 and 15 with their corresponding inductor segment 33. The similar result occurs with regards to coils 12 and 13, pole teeth members 16, 17, 18 and 19 and their respective inductor segments 34 and 35.

As the pole ring pairs 8, 9 and 10 and their respective pole teeth are rotated, such interlinkage sets up or generates eddy-currents in the inductor segments which by the production of reactive magnetic fields cause clutch rotor assembly 29 including its inductor segments 33, 34 and 35, disc members 31, hub member 40 and drive shaft 2 to be driven at a certain slip speed. In other words, the rotation of the eddy-current clutch assembly 6 generates eddy-currents in the inductor segments 33, 34 and 35 resulting in a driving torque being created which operates to rotate and drive the clutch rotor assembly 29 at a speed which is less than that of the clutch assembly 6. As a result, power is transmitted to a load at a given speed which can be controlled by properly energizing the field coils 11, 12 and 13 of the eddy-current coupling by means which are readily available and known in the art.

Since the eddy-current coupling is a slip speed power transmitting device wherein the output member rotates at a speed less than that of the input member in order to obtain the coupling action, the horsepower difference between the input and output members is converted into thermal energy, which is heat. This heat is absorbed by the inductor member and must be effectively dissipated.

The thermal absorption capacity of an eddy-current coupling is determined by the temperature of the inductor member which normally will vary resulting in inductor hot spots. Thus, a uniform inductor temperature will result in an improvement in the eddy-current coupling's capability to dissipate heat. It will be readily understood that the horsepower rating and thermal efficiency of the eddy-current coupling will be proportional to the coupling's ability to dissipate the heat which is generated.

As discussed above, the fan members 23 and fins 32 operate to draw air through the coupling in an axial manner, thus absorbing and dissipating effectively a substantial portion of the heat generated by the coupling. However, since the cooling air moves axially through the coupling, its cooling capability becomes less effective, as it passes over the second or middle pole ring member 9, pole teeth 16 and 17 and their associated inductor segment 34. One reason for this phenomena is that the cooling air has already absorbed some heat while cooling and passing axially across the first ring pair 8, its coil member and pole teeth 11 and 14, 15 respectively and inductor segment 33.

Also in multiple coil eddy-current couplings, flux leakages between the field members vary resulting in different values of torque being generated by the field members which also contribute to temperature variations between field sections. Thus, in addition to the cooling air becoming warmer as it passes across the second section of the field assembly and inductor drum segments, the center or second section of the field assembly consisting of ring member 9, teeth 16 and 17, coil 12 and the corresponding inductor segment 34 generates additional heat due to the increase in flux leakage which appears at this center section as compared with the two end sections. In other words, because the center section consisting of pole ring 9 and its interdigitated teeth members 16 and 17 is flanked on both sides by similar pole ring and teeth members, the flux leakage which occurs in the central portion is greater than that which exists in the end ring sections. Such additional flux leakage causes more heat to be generated at the center section which must be effectively dissipated. For example, in prior eddy-current couplings a 150° Fahrenheit difference in temperature existed between adjacent field sections while couplings constructed according to the present invention experience a temperature difference of approximately 25° Fahrenheit between adjacent field sections. Thus, by more evenly distributing the heat generated between the three pole ring sections and their corresponding inductor segments, the heat dissipation capabilities of the coupling is increased resulting in an improvement in the thermal efficiency and horsepower rating of the coupling.

This even distribution of heat is accomplished by making the widths of magnetic air gaps 38, 39 and 40 different with respect to each other. Prior to this invention it was common to have a substantially constant or uniform air gap. By changing the widths of each air gap between sections, the heat generated is more evenly distributed and the coupling's ability to dissipate such heat is increased. Such results in an increased horsepower rating of the eddy-current coupling and ensures the availability of a wider range of its adaptation and application. One way to vary such air gap is by machining the inductor segments 33, 34 and 35 in such a fashion that the air gaps 38, 39 and 40 have distinctly different and substantially uniform widths with respect to one another. An example of such width dimensions of the air gap is as follows:

(1) The air gap 38 equal to .059 inch,
(2) the air gap 39 equal to .063 inch, and
(3) the air gap 40 equal to .055 inch.

Thus, there is a .004 inch difference between the air gaps 38 and 39 and a .008 inch difference between the air gaps 39 and 40.

Tests have shown that such a variance in the air gaps has resulted in an increase of 10 to 15 percent in the horsepower rating, thus increasing considerably the thermal efficiency of the coupling. It will be readily understood that the above dimensions are merely stated for exemplary purposes and are not intended in any way as being in a limited nature as various air gap widths may be desirable depending upon the application and size of the coupling.

Although an air cooled eddy-current coupling is disclosed in FIGURE 1, it will be understood that the invention is also applicable to liquid cooled couplings.

Another form of the invention is shown in FIGURE 2 which discloses a schematic diagram of the field coils connected in a circuit arrangement. Field coils 11, 12 and 13 are connected in parallel across a D.C. voltage supply of the type discussed above.

A variable resistance 110 is inserted in series with the second or middle field coil 12.

A substantially uniform temperature spread across the axial width of the drum segments 33, 34 and 35 and corresponding field assembly pole ring pairs 8, 9 and 10 of FIGURE 1 can be accomplished by controlling the applied voltage to the center coil 12 such that its magnitude is less than the voltage applied to the end coils 11 and 13.

This is accomplished by properly adjusting the variable resistance 110 whereby the voltage applied to field coil 12 is controlled such that its magnitude is less than the magnitude of voltage applied to the coils 11 and 13.

From the above, it will be seen that the couplings which are made according to the present invention, that is those couplings which either vary the width of the air gap which separates the relatively rotatable clutch field member and rotor members 6 and 29 respectively, in the manner described above, or by controlling effectively the magnitude of the voltage applied to the adjacent coils 11 and 13, the efficiency of the coupling is considerably increased since its ability to dissipate heat is considerably greater than that of prior art structures.

Such couplings constructed in a manner as taught by this invention also effect cooler overall operation which reduces distortion of the parts and prolongs the operating life of the device. Low distortion is particularly important in respect to the inductor segments adjacent the comparatively small air gaps 38, 39 and 40 and the axial gaps referred to above which separate various inductor segments. It will also be understood that although the driving and driven members are in a relationship as shown above, it is possible that the function of the driving member could be reversed and thus be used as a driven member while the driven member could be used as a driving member provided such were desirable in the application for which the coupling is designed. It will further be understood that the advantages of the invention as pointed out above, will also be achieved in the event it is desirable to maintain the clutch field assembly or rotary assembly stationary. Such will then operate as an eddy-current brake or as an eddy-current dynamometer, wherein, instead of a driving torque being transmitted to the rotating member, the stationary member generates a braking torque.

Furthermore, it is readily understood and intended that the field and pole assemblies and magnetizable inductor sections are not limited to three as shown in the drawings and that the plurality of inductor and field segments of the coupling need not necessarily correspond to the number of field coils. In other words, three magnetizable pole and magnetizable inductor segments and field coils are shown merely for exemplary purposes and not intended in any way to be limiting as far as the teachings of this invention which appear in the above description are concerned.

Also, an eddy-current coupling having only a single field coil can be constructed according to an incorporate the teachings of the form of the invention disclosed in FIGURE 1.

In view of the above, it will be seen that the several objects of the invention are achieved and other advantageous results obtained. As various changes could be made in the above construction without departing from the scope of the invention, it is intended that all matter contained in the above description or shown in the accompanying drawing shall be interpreted as illustrative and not in a limiting sense.

What I claim is:

1. An eddy-current coupling comprising first and second relatively rotatable members;
    said first member including a plurality of series of annularly disposed pole members;
    a coil means associated with said series of pole members for establishing a toroidal magnetic field;
    said second member comprising an inductor drum means;
    an air gap separating the pole members and drum means of said first and second members;
    said air gap having a different width for each adjacent series of said pole members for maintaining a substantially uniform temperature across the axial length of said air gap.

2. An eddy-current coupling according to claim 1 wherein said drum means includes a plurality of sections axially spaced and equal in number to said series of pole members.

3. An eddy-current coupling according to claim 1 wherein said first member comprises at least three series of pole members.

4. An eddy-current coupling according to claim 3 wherein said second member comprises an inductor drum means having at least three axially spaced drum sections, each of said drum sections being associated with a separate series of pole members.

5. An eddy-current coupling according to claim 4 wherein the width of the air gap between the first of said pole members and drum sections is less than the width of the air gap between the second of said pole members and drum sections and greater than the width of the air gap between the third of said pole members and drum sections.

6. An eddy-current coupling comprising first and second relatively rotatable members;
    said first member comprising at least three series of annularly disposed pole members;
    a coil means associated with said series of pole members for establishing a toroidal magnetic field;
    said second member comprising an inductor drum means having at least three axially spaced sections, each section being associated with a separate series of pole members;
    an air gap separating the pole members of said first member and the drum means of said second member;
    said air gap having a different width for each adjacent series of said pole members and drum sections for maintaining a substantially uniform temperature across the axial length of said air gap.

7. An eddy-current coupling according to claim 6 wherein the width of the air gap between the first of said pole members and drum sections is less than the width of the air gap between the second of said pole members and drum sections and greater than the width of the air gap between the third of said pole members and drum sections.

8. An eddy-current coupling comprising first and second relatively rotatable members;
    said first member comprising a plurality of series of annularly disposed pole means;
    a coil means associated with each series of pole means for establishing a toroidal field;
    a source of electrical voltage for energizing each of said coil means;
    said second member comprising an inductor drum means;
    an air gap separating the pole means of said first member and the drum means of said second member;
    means for varying the voltage applied to said coil means such that the magnitude of voltage applied to one of said coil means is less than the magnitude of voltage applied to said other coil means for maintaining a substantially uniform temperature across the axial length of said air gap.

9. An eddy-current coupling according to claim 8 whereby said means for varying said voltage is an adjustible impedance.

10. An eddy-current coupling according to claim 8 including at least three series of annularly disposed pole means;
    at least three coil means;
    and means for varying the voltage applied to the second of said coil means whereby the magnitude of such voltage is less than the magnitude of voltage applied to the first and third coil means which are axially disposed on opposite sides of said second coil means for maintaining a substantially uniform temperature across the axial length of said air gap.

References Cited

UNITED STATES PATENTS

| | | | |
|---|---|---|---|
| 3,103,605 | 9/1963 | Russell | 310—105 |
| 3,121,180 | 2/1964 | Winther | 310—105 |
| 3,218,494 | 11/1965 | Bacon | 310—114 |
| 3,271,601 | 9/1966 | Raver | 310—58 |

MILTON O. HIRSHFIELD, Primary Examiner

R. SKUDY, Assistant Examiner